United States Patent [19]
Shemtov

[11] 3,991,990
[45] Nov. 16, 1976

[54] FIXTURE FOR HOLDING A TUBULAR WORKPIECE DURING THE MACHINING THEREOF

[75] Inventor: Sami Shemtov, Brooklyn, N.Y.

[73] Assignee: I-T-E Imperial Corporation Efcor Division, East Farmingdale, N.Y.

[22] Filed: Apr. 23, 1975

[21] Appl. No.: 570,819

[52] U.S. Cl. ............................. 269/25; 269/257; 269/287
[51] Int. Cl.² ..................................... B23Q 3/06
[58] Field of Search .............. 51/236; 269/25, 26, 269/27, 32, 35, 257, 265, 285, 287; 279/4, 1 L; 81/418; 30/228, 180

[56] References Cited
UNITED STATES PATENTS

| | | | |
|---|---|---|---|
| 2,140,682 | 12/1938 | Strauss | 269/26 |
| 2,373,163 | 4/1945 | Cailloux et al. | 269/32 |
| 2,679,177 | 5/1954 | Gepfert | 269/35 |
| 2,732,745 | 1/1956 | Behr | 269/257 |
| 2,945,523 | 7/1960 | Jenkins | 269/23 |
| 3,385,592 | 5/1968 | Hasell et al. | 269/287 |
| 3,386,726 | 6/1968 | Lorenz | 269/32 |
| 3,834,215 | 9/1974 | Lemley | 30/180 |

Primary Examiner—Al Lawrence Smith
Assistant Examiner—Robert C. Watson
Attorney, Agent, or Firm—Friedman, Goodman & Teitelbaum

[57] ABSTRACT

A fixture is disclosed for holding a tubular workpiece during the machining thereof. The fixture includes a base plate that is adapted to be placed over a mandrel that supports the workpiece. A pair of spaced apart blocks are slidably mounted on the base plate and each includes a plurality of roller means that depend downwardly therefrom. Guide means are provided for the blocks which are displaced towards the axis of the workpiece by means of a pair of opposed air cylinders so that the roller means engage the periphery of the workpiece and center the workpiece with respect to the axis of the mandrel. The workpiece may then be machined such as by forming external threads thereon.

5 Claims, 7 Drawing Figures

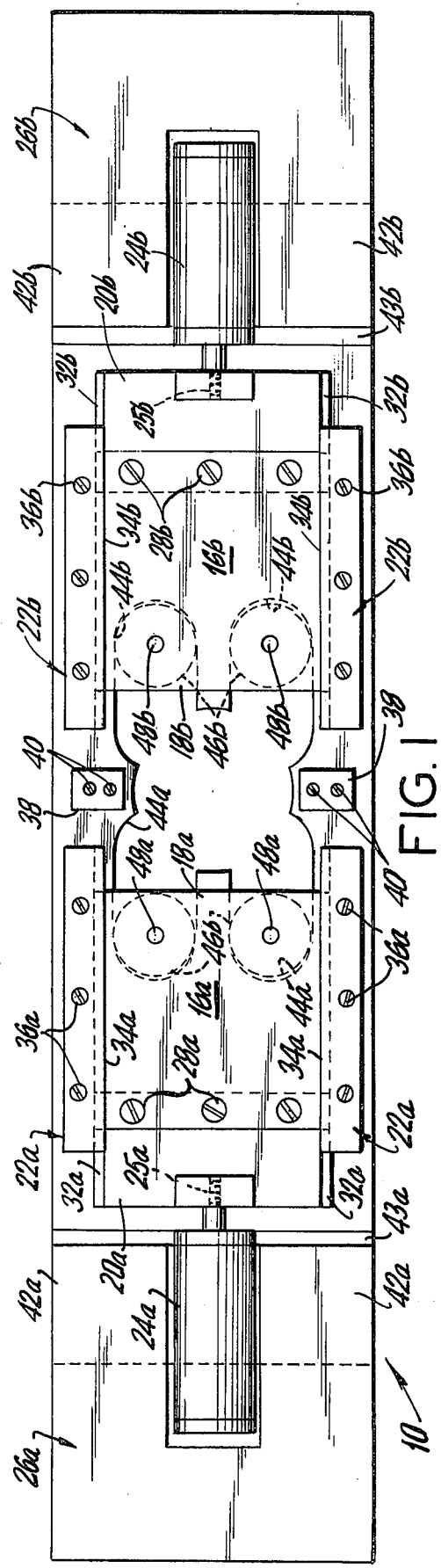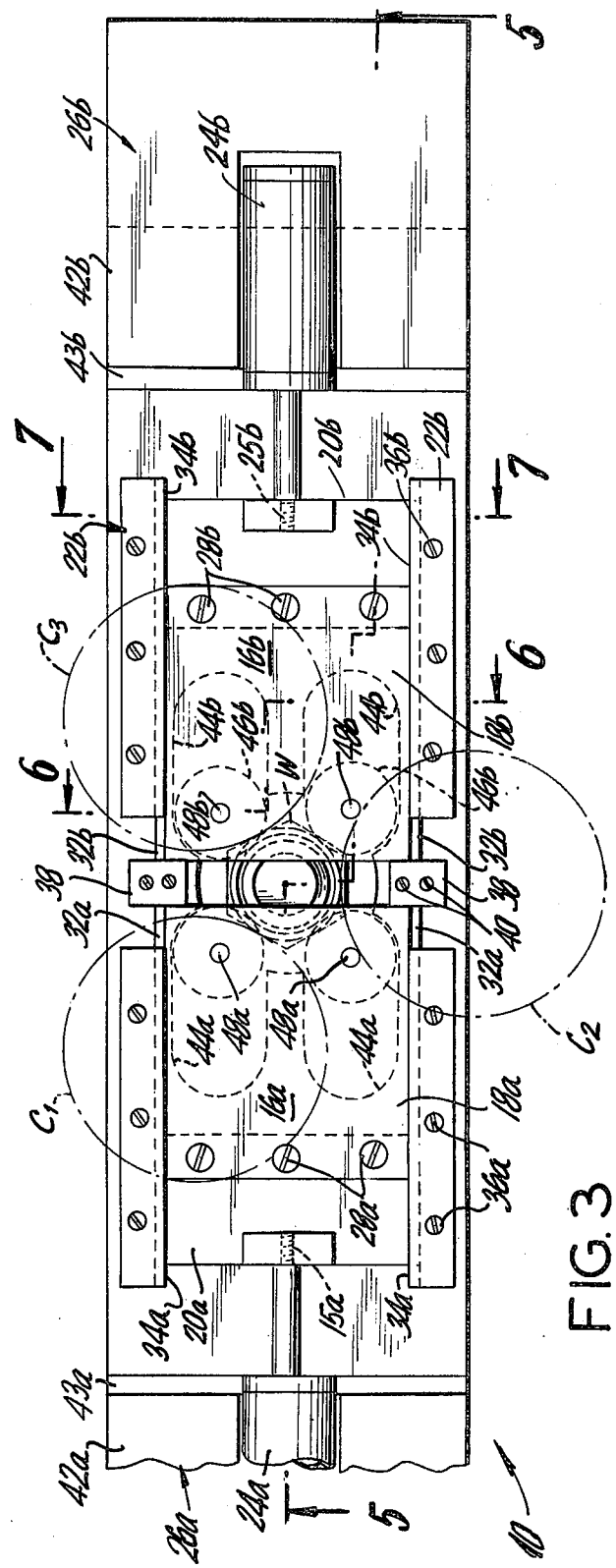
FIG. 1
FIG. 3

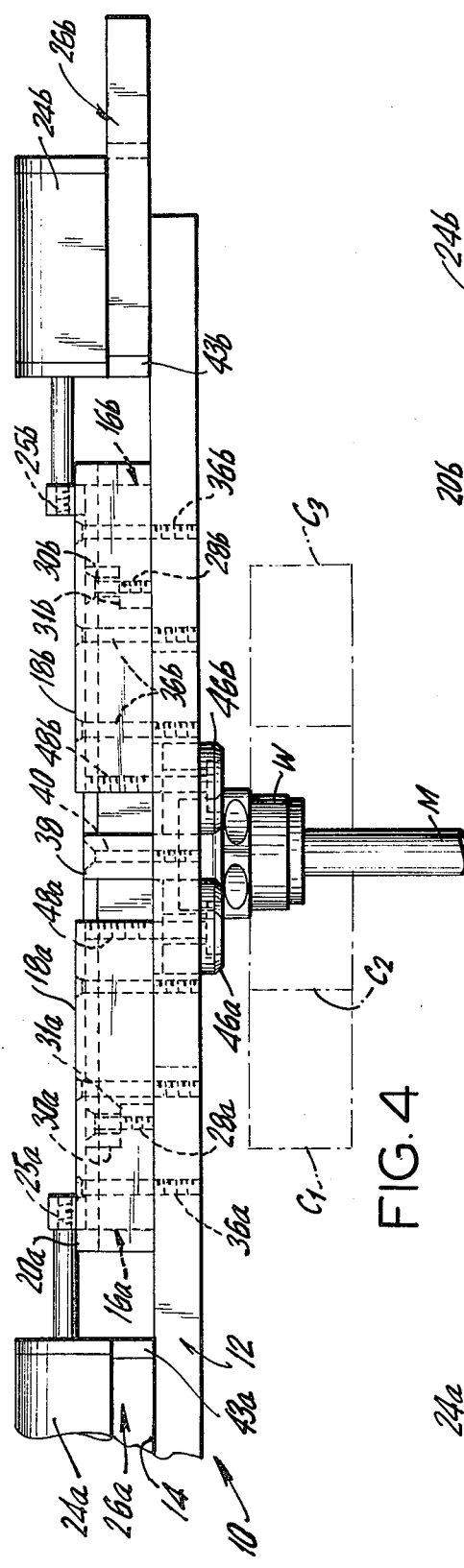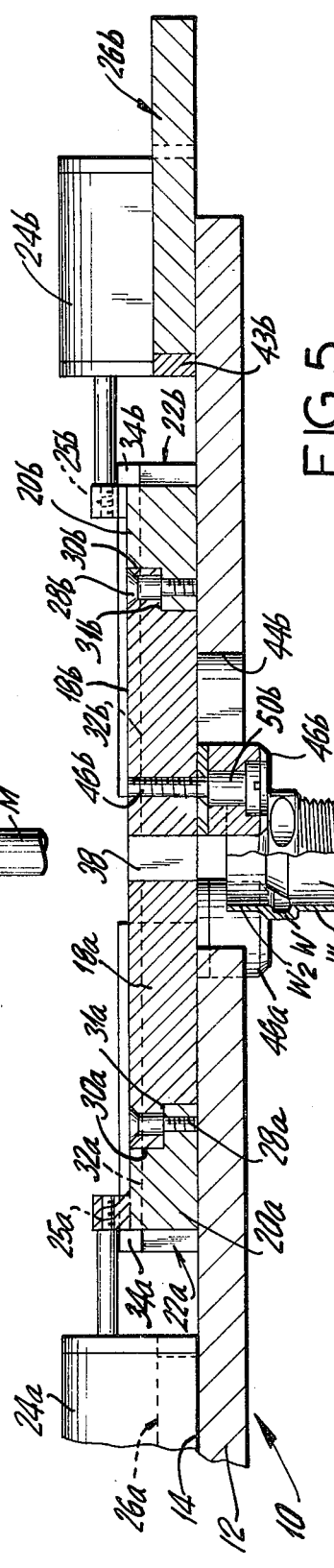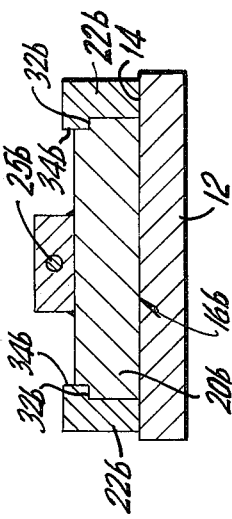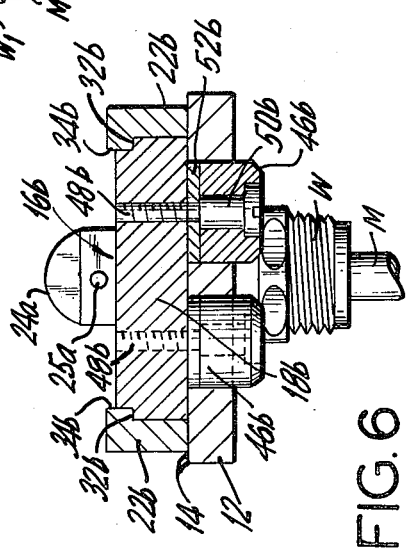

FIXTURE FOR HOLDING A TUBULAR WORKPIECE DURING THE MACHINING THEREOF

BACKGROUND OF THE INVENTION

1. Field of the Invention

This invention generally relates to the machine tool art and more particularly to an improved fixture for accurately holding a workpiece that is to be machined.

2. Description of the Prior Art

In the past, tubular members such as externally threaded couplings for coaxially arranged pipes or tubes have been machined by placing the coupling on a mandrel and then bringing the thread cutting means into engagement with the peripheral surface of the coupling. Because the workpiece must be rapidly loaded onto the mandrel and unloaded from the mandrel, it is evident that there must be a relatively loose fit between the external surface of the mandrel and the internal surface of the workpiece.

This loose fit has, in the past, caused some difficulties in the machining of the workpiece and has caused some reduction in the accuracy of the machining operation.

SUMMARY OF THE INVENTION

The present invention provides means for overcoming the deficiencies of the prior art. A fixture is provided that is adapted to be located above the mandrel that supports the workpiece which is to be machined. The fixture includes a base plate having a central opening that is coaxial with the mandrel and the workpiece. A pair of slidable blocks are positioned on the base plate in opposition to each other. Each of the block supports a pair of rollers which depend downwardly from the undersurface thereof. The present invention provides means for displacing the blocks in an accurately guided manner so that the rollers engage the periphery of the workpiece and thereby accurately locate the workpiece relative to the axis of the mandrel and the apparatus that will ultimately perform the machining operation. In one illustrated embodiment, each of the blocks is provided with two rollers so that, in combination, there are four rollers which are equally spaced apart in an angular direction with respect to the periphery of the workpiece.

Accordingly, it is an object of the present invention to provide an improved fixture for locating a workpiece relative to the support means therefor.

Another object of the present invention is to provide an improved fixture which can be positioned for accurately retaining a workpiece in a predetermined position relative to the apparatus that will perform the machining operation on the workpiece.

It is another object of the present invention to provide an improved fixture, as described above, wherein the blocks that support the workpiece engaging rollers are accurately guided for movement along linear paths in a direction towards each other.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of a preferred embodiment, where in the various figures of the drawings like reference characters designate like parts, in which:

FIG. 1 is a plan view of the present invention in a first, non-operative position;

FIG. 3 is another plan view, similar to FIG. 1, showing the present invention in a second, operative position;

FIG. 4 is a side elevational view of the structure shown in FIG. 3;

FIG. 5 is a longitudinal, sectional elevational view taken along 5—5 of FIG. 3;

FIG. 6 is a transverse, sectional elevational view taken along line 6—6 of FIG. 3; and FIG. 7 is another transverse sectional elevational view taken along line 7—7 of FIG. 3.

DESCRIPTION OF THE PREFERRED EMBODIMENT

Figure 2:
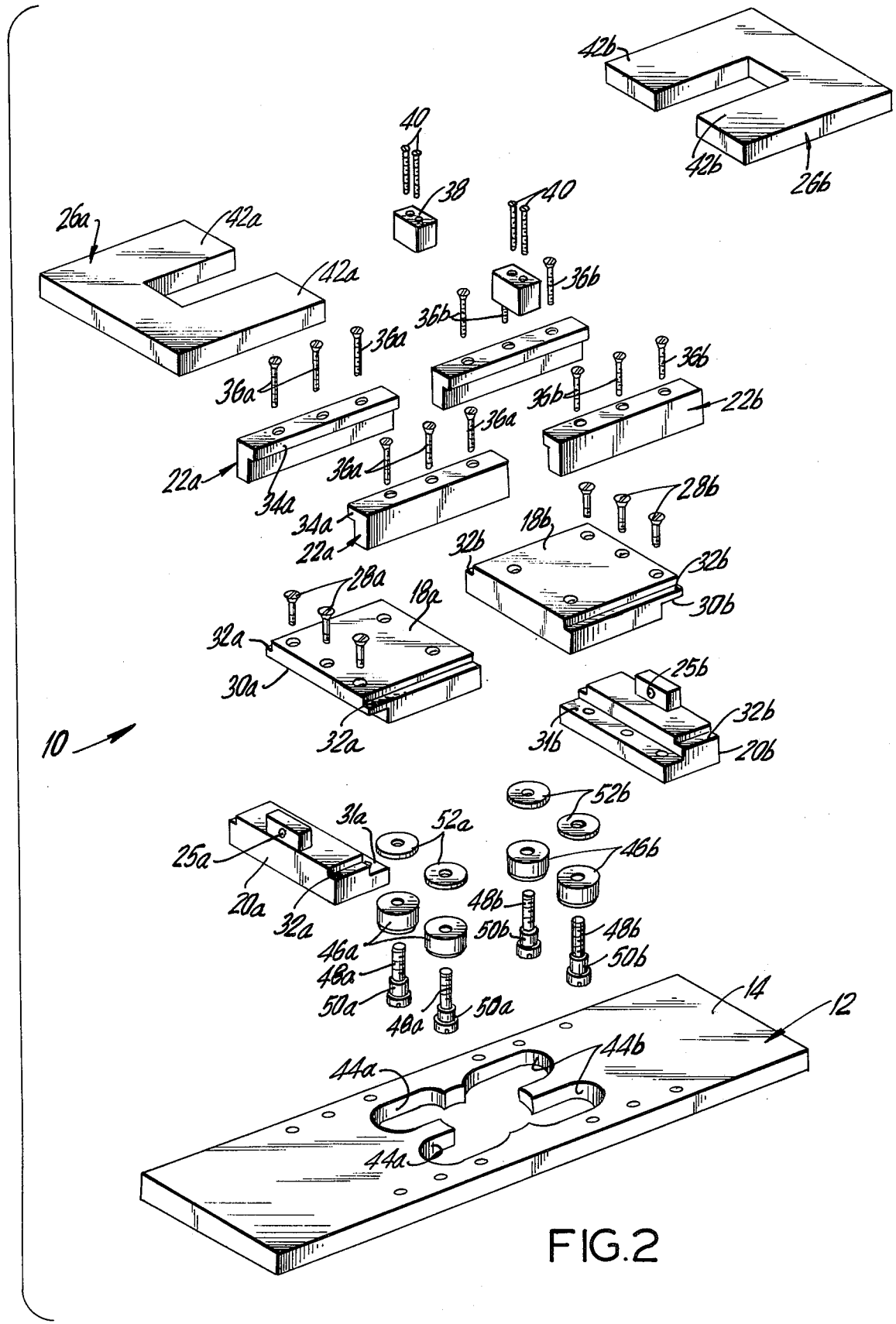
FIG. 2 is a perspective exploded view of the components comprising the present invention.

Referring now to the drawing, there is shown an improved fixture 10 comprising the present invention. The fixture 10 includes a base plate 12 having an upper surface 14 on which are mounted a pair of blocks 16a, and 16b. In the embodiment illustrated, each of the blocks 16a and 16b, is comprised of first sections 18a and 18b and second sections 20a, and 20b. A first pair of laterally spaced apart rails 22a are used for retaining and guiding the movable block 16a while a second pair of rails 22b are used for retaining and guiding the second block 16b. A pair of displacing means, for example, conventional air cylinders 24a and 24b which are positioned in opposition to each other, are mounted on the upper surface 14 of the base plate 12 and are coupled to the blocks 16a and 16b, respectively, such as indicated by the reference character 25a and 25b, respectively. Retainer plates 26a and 26b are used for maintaining the air cylinders 24a and 24b in their proper position.

Turning now specifically to FIG. 2, it will be seen that, in the embodiment illustrated, each block 16a and 16b is made of two sections 18a, 20a and 18b, 20b. Fasteners 28a are used for joining the blocks sections 18a and 20a to each other, while fasteners 28b are used for joining the block sections 18b and 20b to each other. The blocks 16a and 16b could, of course, be made of a single piece. However, it has been found convenient for interchangeability or replacement thereof, to make the blocks 16a and 16b in the two sections illustrated. In order to facilitate the assembly of the block sections 18a, 20a, and 18b, 20b, the blocks sections 18a and 18b are each formed with lips 30a and 30b. Similarly, the block sections 20a and 20b are formed with steps 31a and 31b, respectively in order to receive the lips 30a and 30b.

When the block sections 16a and 16b are assembled, it will be seen that they each have a pair of laterally spaced apart ways 32a and 32b. Ribs 34a which are formed integrally with each of the rails 22a and ribs 34b which are formed integrally with each of the rails 22b engage the ways 32a and 32b, respectively. Fasteners 36a are used for securing the pair of rails 22a to the upper surface 14 of the base plate 12 while fasteners 36b are used for securing the pair of rails 22b to the upper surface 14 of the base plate 12. As best shown in FIGS. 1 and 3, a pair of stop members 38 are secured to the upper surface 14 of the base plate 12 by means of fasteners 40. The stop members 38 are positioned intermediate the blocks 16a and 16b and serve to limit the movement of the blocks 16a and 16b towards each other as shown for example in FIG. 3.

As shown for example in FIG. 2, the retainer members 26a and 26b are U-shaped. The retainer 26a has a pair of spaced apart legs 42a for locating the air cylinder 24a while the retainer 26b has a pair of spaced apart legs 42b for accurately locating the air cylinder 24b. Cylinder mount plates 43a and 43b secure the air cylinders 24a, 24b in position, respectively, in a conventional manner.

The base plate 12, as shown in FIG. 2, is provided with two pair of cut-outs 44a and two pair of cut-outs 44b. A first pair of rollers 46a are secured beneath the section 18a of the block 16a by means of fasteners 48a having bearing surfaces 50a. A pair of washers 52a are positioned between the upper surface of the rollers 46a and the underside of the section 18a. Similarly, a pair of rollers 46b are secured to the section 18b of the block 16b by means of fasteners 48b, each of which includes a bearing surface 50b. In a like manner a pair of washers 52b are positioned between the upper surface of the rollers 46b and the undersurface of the section 18b. As shown for example, in FIGS. 5 and 6, the rollers 46a and 46b depend downwardly from the blocks 16a and 16b, respectively, and are positioned within the cut-outs 44a and 44b, respectively.

As shown for example in FIGS. 4, 5 and 6, the work piece W which in the embodiment illustrated is a tubular member that is to have threads cut on the outside surface of the bottom half thereof, is mounted loosely on a mandrel M and is positioned adjacent thread cutting means shown in phantom outline in FIGS. 3 and 4 and designated by the reference characters C1, C2 and C3. When the pistons of the air cylinders 24a and 24b are extended, the blocks 16a and 16b will move in a direction towards each other and will be guided by the rails 22a and 22b. The rollers 46a and 46b will travel along the cut-outs 44a and 44b until they tangentially engage the periphery of the upper half of the workpiece W. It will be appreciated that, because the two blocks 16a and 16b as well as the two cylinders 24a and 24b are used in conjunction with two pairs of rollers 46a and 46b, the four rollers 46a and 46b will be equally spaced apart from each other in an angular direction about the periphery of the workpiece W and will thereby accurately position the workpiece W with respect to the axis of the mandrel M and with respect to the common centerpoint about which the cutters C1, C2 and C3 are equally spaced. After the threads are cut on the lower portion of the workpiece W that is designated by the reference character W1, the workpiece W may be inverted by placing the section designated by the reference character W2 on the mandrel M and then the operation may be repeated in order to cut a second set of threads on the other half. It will be appreciated that the positioning of the two pairs of rollers 46a and 46b in the manner illustrated does not interfere with the thread cutting operation.

Obviously, the fixture 10 of the present invention may be mounted above the cutters C, C2 and C3 of the machining apparatus by any conventional support means which are well known by those skilled in the art, so that the workpiece can be accurately positioned with respect to the mandrel M by the fixture 10. In as much as these conventional support means do not form a part of the present invention, it is not thought necessary to show same in the drawings, in the same way and for the same reason that the complete machining apparatus which performs the machining operation on the workpiece is not shown.

While air cylinders have been suggested hereinabove as means for displacing the blocks, it should be understood that the invention in its broadest aspect is not so limited. Equivalent hydraulic pneumatic or electrical components may also be utilized. Nor is it intended that the invention be limited to the precise number of roller means that have been described and illustrated.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:
1. A fixture for engaging an elongated, tubular workpiece that is mounted on a mandrel of a machining apparatus during machining of a portion of the workpiece, said fixture comprising
   a. a base plate adapted to be mounted above the machining apparatus;
   b. a pair of movable, spacedly opposed blocks positioned on and horizontally movable relative to said base plate;
   c. guide means for guiding said blocks during the horizontal movement thereof, said guide means including two pairs of laterally spaced apart rails secured to said base plate, said rails in each said pair being in opposition to each other to allow one of said blocks to be freely movable between said rails comprising each said pair;
   d. each said block including an elongated way on opposite side edges thereof that are parallel to the horizontal movement thereof, said guide means including ribs for engaging said ways;
   e. stop means secured to said base plate and intermediate said blocks for limiting the movement of said blocks in a drection towards each other
   f. a plurality of roller means mounted on said blocks for movement together therewith, said roller means having rotational vertical axes that are substantially parallel to longitudinal axis of the elongated workpiece;
   g. said plurality of roller means including two roller means secured to each said block and depending downwardly from an underside thereof;
   h. said base plate including cut-out means for receiving each said roller means and for permitting the workpiece to pass through said base plate for mounting on the mandrel, said roller means being equally spaced apart in an angular direction to engage a periphery of the workpiece when said fixture is positioned above the mandrel that supports the workpiece; and
   i. means for displacing said blocks towards the axis of said workpiece for permitting said roller means to tangentially engage the periphery of the workpiece.

2. The fixture according to claim 1 wherein each said block is comprised of first and second sections, said roller means being mounted on said first section and said displacing means being secured to said second section.

3. The fixture according to claim 1 wherein said displacing means comprise a pair of air cylinders each of which includes a piston secured to one of said blocks.

4. The fixture according to claim 3 wherein there is further includes a retainer for positioning each said air cylinder on said base plate.

5. The fixture according to claim 4 wherein each said retainer comrises a U-shaped member rigidly secured to said base plate, each said air cylinder being positioned between the legs of said U-shaped retainer.

* * * * *